No. 798,969. PATENTED SEPT. 5, 1905.
M. L. LUEBBEN.
MACHINE FOR REELING EDIBLE FIBROUS MATERIAL AND GRAIN.
APPLICATION FILED JUNE 11, 1903. RENEWED MAR. 22, 1905.
7 SHEETS—SHEET 1.
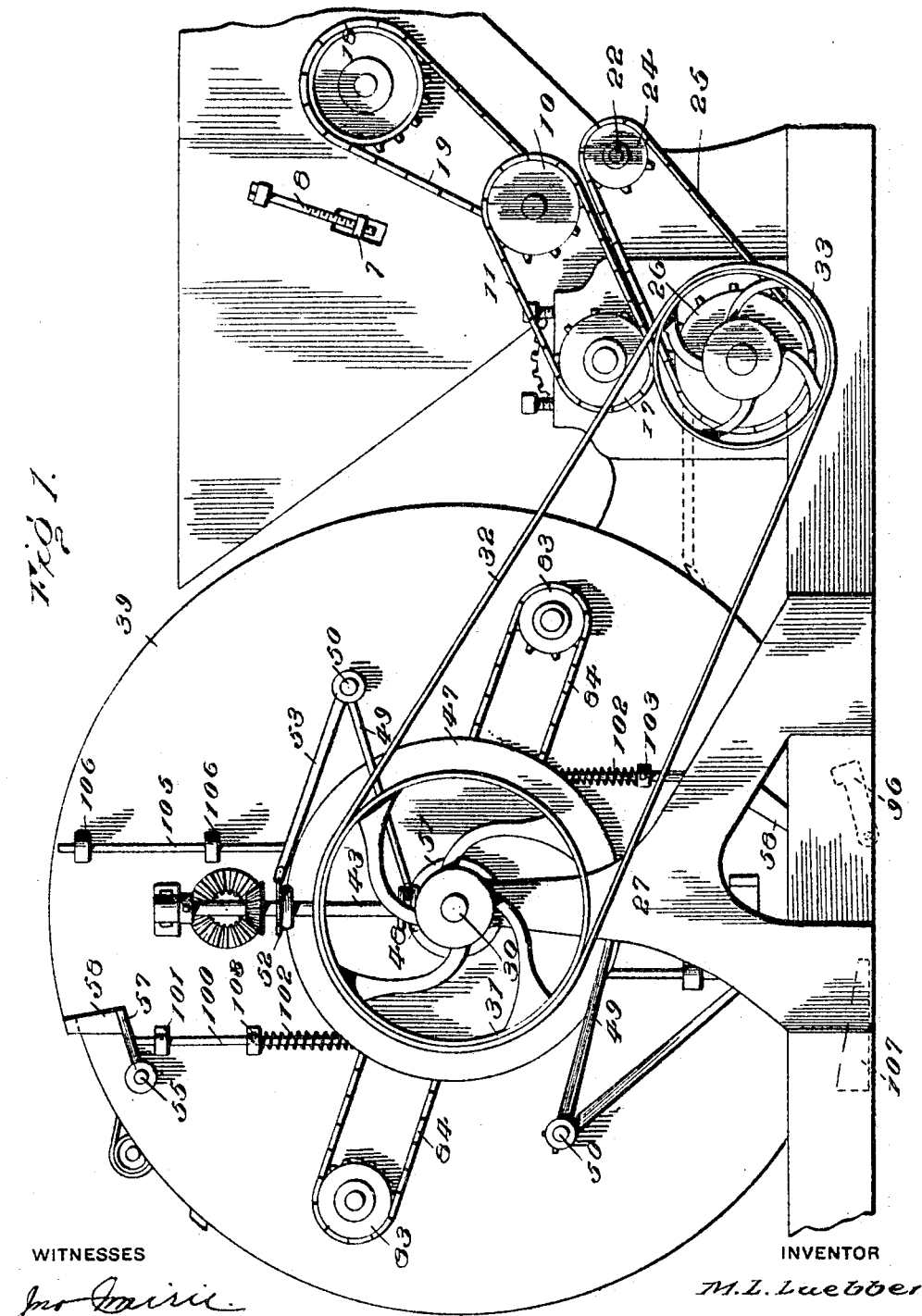
WITNESSES
INVENTOR
M. L. Luebben
by,
R. S. & A. B. Lacey.
Att'y's No. 798,969. PATENTED SEPT. 5, 1905.
M. L. LUEBBEN.
MACHINE FOR REELING EDIBLE FIBROUS MATERIAL AND GRAIN.
APPLICATION FILED JUNE 11, 1903. RENEWED MAR. 22, 1905.
7 SHEETS—SHEET 2.
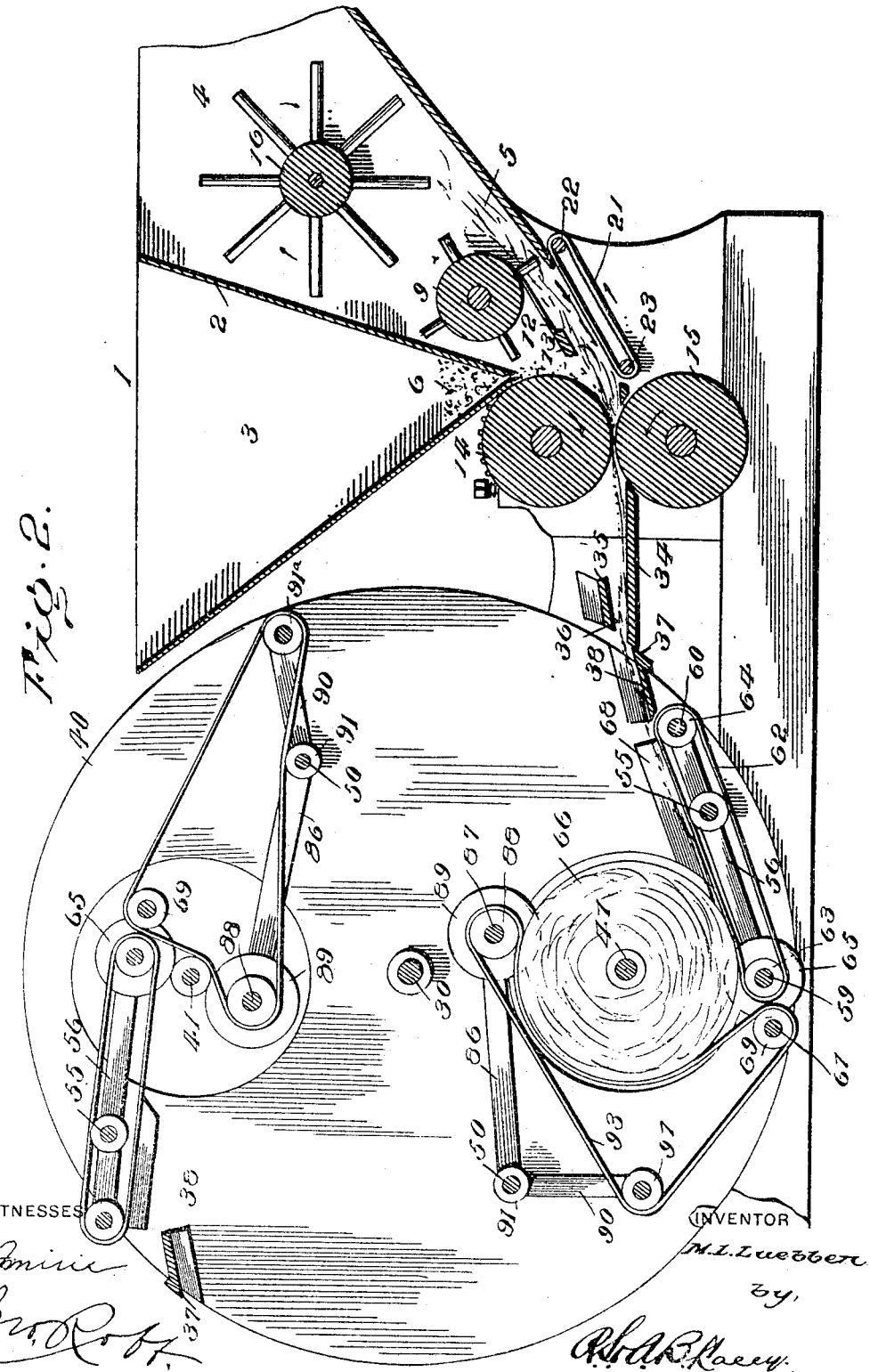

No. 798,969. PATENTED SEPT. 5, 1905.
M. L. LUEBBEN.
MACHINE FOR REELING EDIBLE FIBROUS MATERIAL AND GRAIN.
APPLICATION FILED JUNE 11, 1903. RENEWED MAR. 22, 1905.
7 SHEETS—SHEET 3.
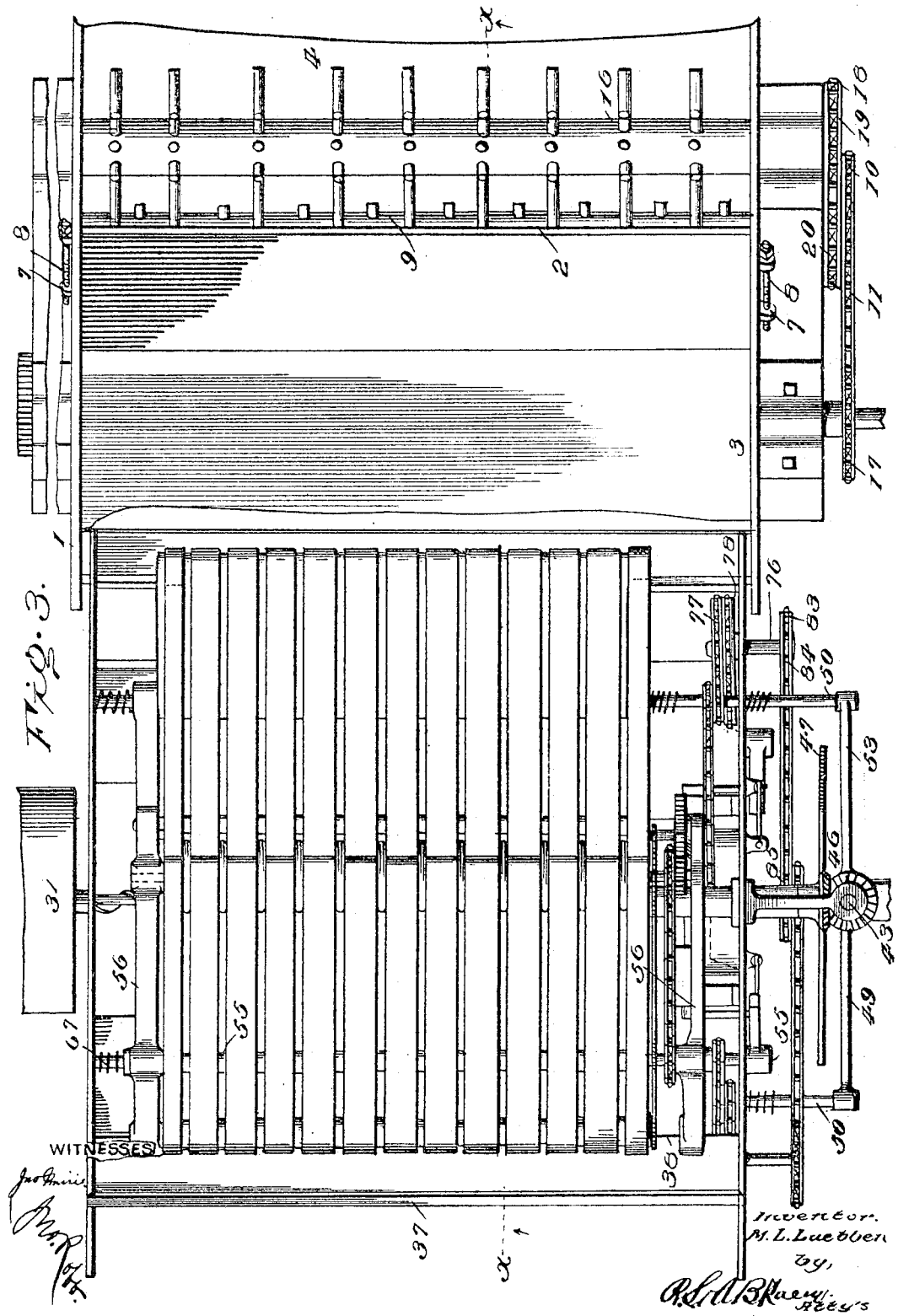

No. 798,969. PATENTED SEPT. 5, 1905.
M. L. LUEBBEN.
MACHINE FOR REELING EDIBLE FIBROUS MATERIAL AND GRAIN.
APPLICATION FILED JUNE 11, 1903. RENEWED MAR. 22, 1905.
7 SHEETS—SHEET 4.
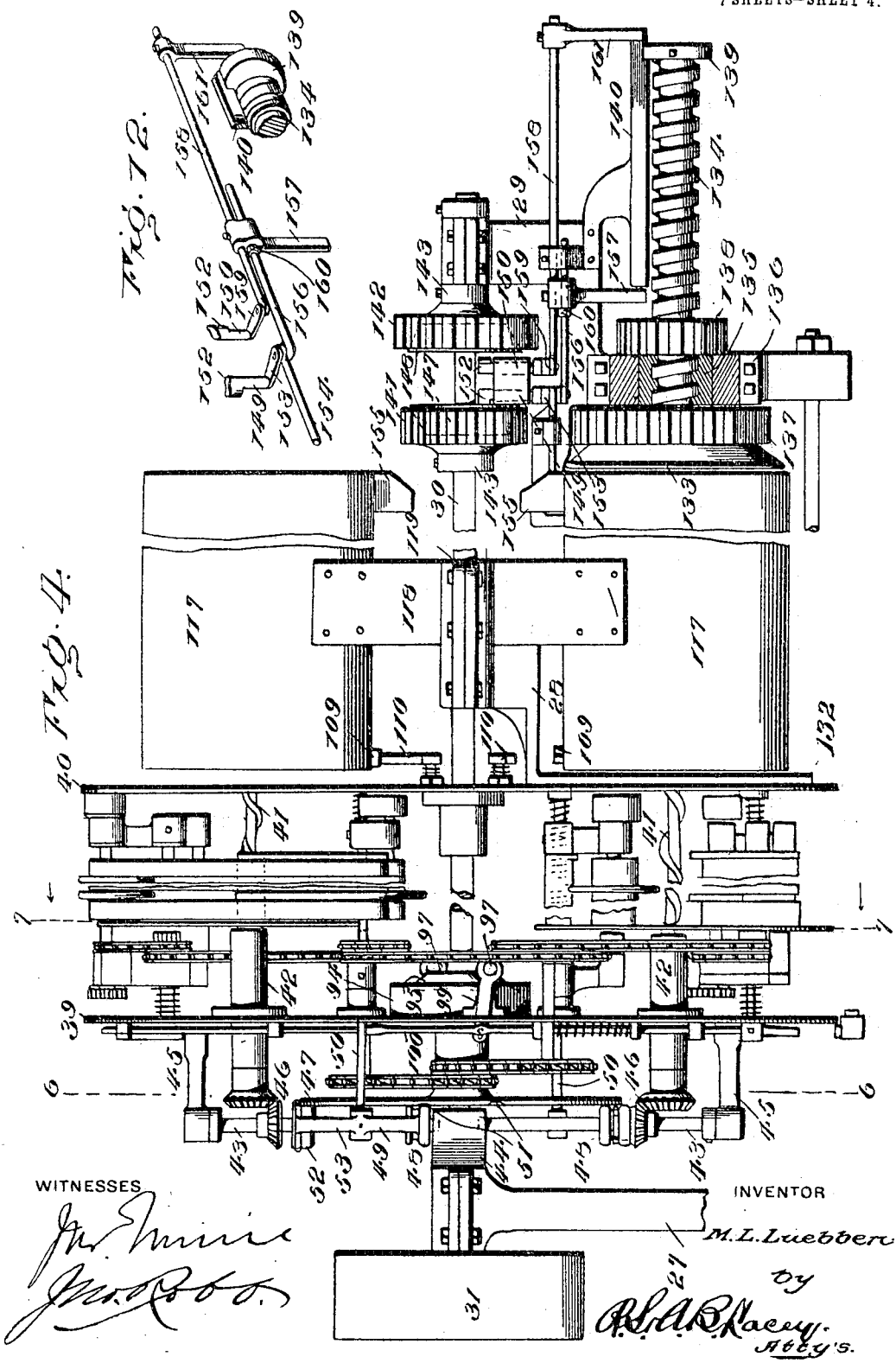

No. 798,969. PATENTED SEPT. 5, 1905.
M. L. LUEBBEN.
MACHINE FOR REELING EDIBLE FIBROUS MATERIAL AND GRAIN.
APPLICATION FILED JUNE 11, 1903. RENEWED MAR. 23, 1905.
7 SHEETS—SHEET 5.
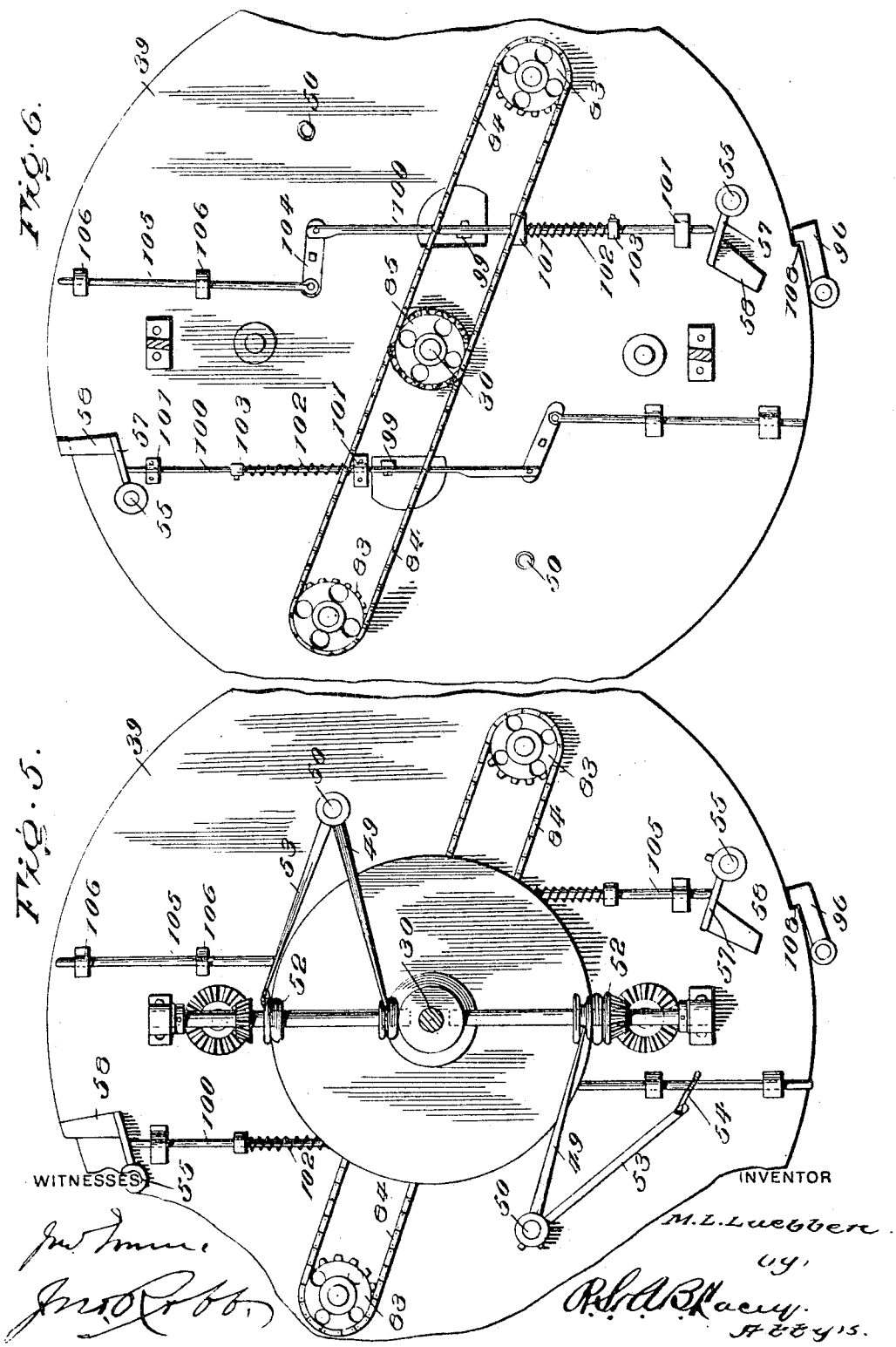

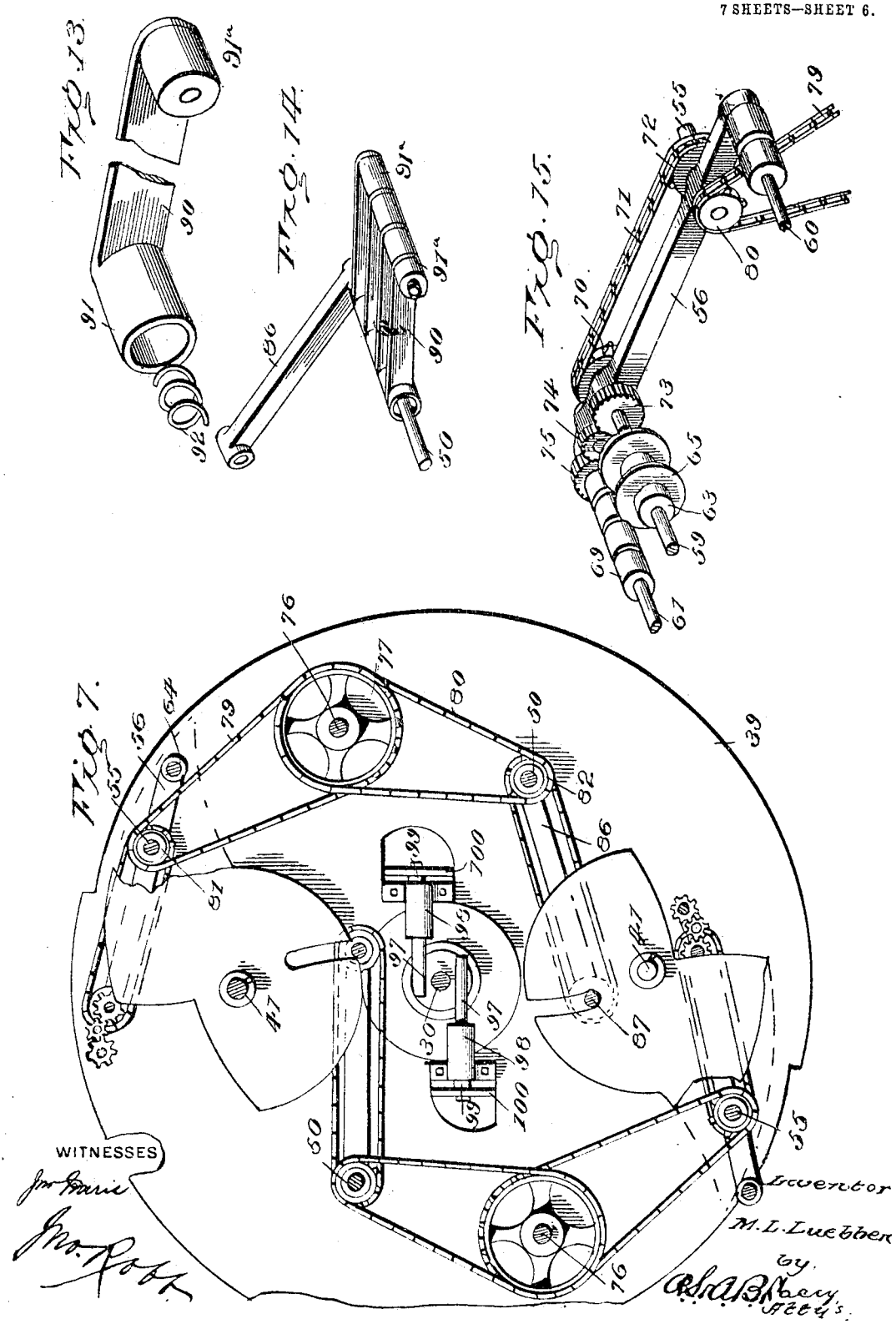

No. 798,969. PATENTED SEPT. 5, 1905.
M. L. LUEBBEN.
MACHINE FOR REELING EDIBLE FIBROUS MATERIAL AND GRAIN.
APPLICATION FILED JUNE 11, 1903. RENEWED MAR. 22, 1905.
7 SHEETS—SHEET 7.
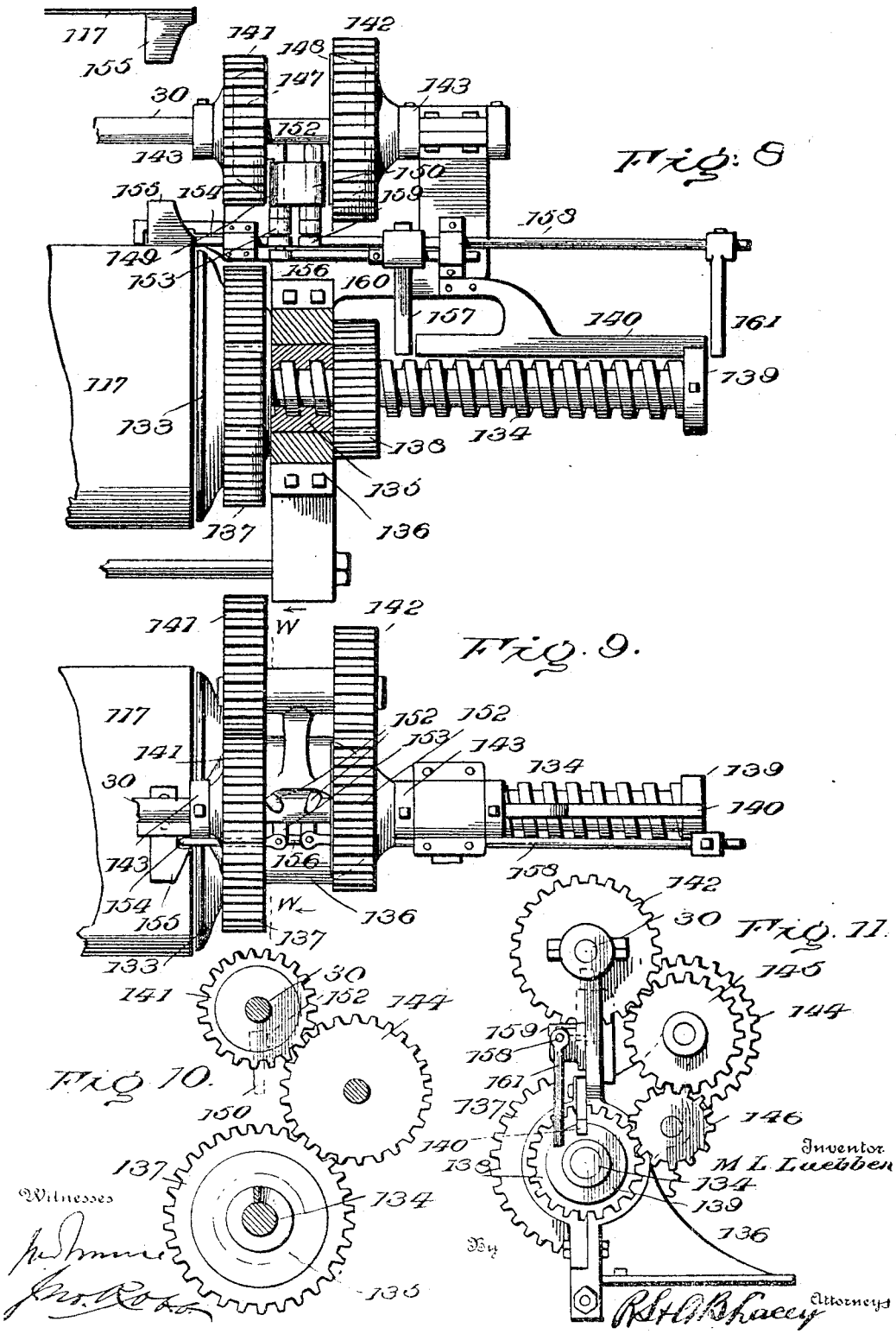

UNITED STATES PATENT OFFICE.

MELCHIOR L. LUEBBEN, OF SUTTON, NEBRASKA, ASSIGNOR TO THE LUEBBEN BALER COMPANY, OF LINCOLN, NEBRASKA.

MACHINE FOR REELING EDIBLE FIBROUS MATERIAL AND GRAIN.

No. 798,969.      Specification of Letters Patent.      Patented Sept. 5, 1905.

Application filed June 11, 1903. Renewed March 22, 1905. Serial No. 251,493.

*To all whom it may concern:*

Be it known that I, MELCHIOR L. LUEBBEN, a citizen of the United States, residing at Sutton, in the county of Clay and State of Nebraska, have invented certain new and useful Improvements in Machines for Reeling Edible Fibrous Material and Grain, of which the following is a specification.

To devise a machine of novel organization for forming hay and like fibrous material into a mat or web, applying grain to a side of the mat, and winding same into a roll or cylindrical bale is the primal intent of this invention.

The machine in its structural organization comprises a mat or web forming mechanism, regulable grain-feeder, compression-rolls for condensing the mat, crushing the grain and embedding same into the mat, winding mechanism for forming the mat into bales or rolls, a cutter for severing the mat when the bales have reached a predetermined size, a binding mechanism for securing the winds or wraps by tucking a portion of same into the bale in the formation thereof, an ejector mechanism for removing the bale when formed, and a compressing mechanism for condensing the bale or roll after being formed, the several parts being automatic in action and arranged to come into play at the proper time in the operation of the machine from the time the hay or fibrous material is fed to the machine until the discharge therefrom of the package ready for market.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of a baling-machine embodying the invention. Fig. 2 is a longitudinal section of the complete machine on the line X X of Fig. 3 looking in the direction indicated by the arrows. Fig. 3 is a top plan view of the machine, a portion of the baling-chamber being broken away. Fig. 4 is a front view of the reel, ejector, and compress mechanism on a larger scale, an intermediate portion of the reel and baling-chambers being broken away. Fig. 5 is an end view of the reel, edge portions of the head being broken away. Fig. 6 is a section of the reel on the line 6 6 of Fig. 4. Fig. 7 is a section of the reel on the line 7 7 of Fig. 4 looking to the left, as indicated by the arrows. Fig. 8 is a detail view of the delivery end of the baling-chambers, showing the reversing, power-transmitting, and clutch devices coöperating therewith. Fig. 9 is a top plan view of the parts shown in Fig. 8. Fig. 10 is a section about on the line W W of Fig. 9 looking in the direction indicated by the arrows. Fig. 11 is an end view of the parts shown in Figs. 8 and 9. Fig. 12 is a perspective view of the trip and clutch operating devices for effecting a reversing of the compress mechanism and throwing same out of action. Fig. 13 is a detail perspective view of a spring-actuated arm and its operating-spring on a larger scale. Fig. 14 is a detail perspective view of an end portion of the shaft carrying the spring-actuated arms, the carrying-arm therefor, and a series of spring-actuated arms mounted on the aforesaid shaft. Fig. 15 is a detail perspective view of one of the arms supporting the guide-belts which direct the web or mat to the spindles.

Corresponding and like parts are referred to in the following description and indicated in all the views of the drawings by the same reference characters.

The hopper 1 for containing the material or commodity to be formed into a bale or package is subdivided by partition 2 into compartments 3 and 4. Compartment 4 is adapted to receive the hay or fibrous material 5, which in the operation of the machine is woven into a mat or web and acts as a carrier for the grain 6 placed in compartment 3 and fed to the upper side of the mat or web in regulable quantity by means of partition 2, which is adjusted so as to contract or enlarge the space through which the grain escapes.

Any suitable means may be provided for adjusting partition 2 and holding same in the required position. As shown, a lug 7 projects from the partition and coöperates with set-screw 8, journaled to a side of the hopper. Within the hopper and at the lower end of compartment 4 is located a toothed roller or drum 9 for positively feeding the fibrous material in the formation of the mat or web, the journal of said toothed roller being extended and provided with a sprocket-wheel 10, receiving motion from a rotating part of the machine by means of drive chain or belt 11. To prevent the hay or fibrous material from being carried around roller or drum 9 by the teeth thereof strippers 12 are employed, same consisting of a series of teeth or fingers projected from a transverse bar or support 13 and adapted to engage at their free ends with roller 9 intermediate of the teeth applied thereto. Strippers 12 incline rearwardly and downwardly and form a throat with the lower portion of the outer side of the hopper through which the fibrous material passes and is initially formed into a mat or web. The stripper device is located adjacent to the compressing-rolls and below the toothed or positive feeder, and the bar 13 thereof serves to give proper direction to the grain in its delivery to the mat or web.

The compressing-rolls 14 and 15 are arranged adjacent to the delivery end of the hopper, so as to receive the mat or web as same emerges therefrom, so as to economize in space and condense the mat as near to the hopper as possible. The space between the compressing-rolls may be varied to subject the mat to a greater or less degree of compressing force. The compressing-rolls are geared together at one end for rotation in unison, whereby their subjacent elements or sides travel in the same direction to insure withdrawal of the mat from the hopper and a forward movement thereof to the guide. Motion is imparted from a suitable source of power to the journal of the lowermost compressing-roll, and the journal of the uppermost compressing-roll is extended and provided with sprocket-wheel 17, drive chain or belt 11 connecting sprocket-wheel 17 with sprocket-wheel 10.

A toothed roller or drum 16 is located in the upper portion of the compartment 4 and supplements the action of the toothed roller 9 in positively advancing the fibrous material to the compressing-rolls. A journal of the toothed roller 16 is extended and provided with sprocket-wheel 18, which is connected by drive-belt 19 with a sprocket-wheel 20 of the extended journal of the toothed roller 9. The toothed rollers 9 and 16 are driven in the direction indicated by the arrows in Fig. 2, so as to force the fibrous material through the throat or space formed below the strippers 12 and their support 13. An endless belt or apron 21 is located below the strippers 12 and the support 13 about in line with the outer wall of the hopper, so as to form, in effect, a continuation thereof. The belt 21 is supported upon rollers 22 and 23, roller 22 being extended and provided with sprocket-wheel 24, connected by drive-belt 25 with sprocket-wheel 26, secured to the journal of lower compressing-roll 15. The upper portion of belt 21 travels downward and rearward toward the compressing-roll, as indicated by the arrow in Fig. 2, so as to positively move the fibrous material thereto.

The reel provided with the spindles upon which the mat or web of fibrous material is wound is located in the rear of the hopper and compressing-rolls and is wholly mounted upon shaft 30, mounted in bearings 27, 28, and 29 and adapted to be intermittently rotated, so as to bring an empty spindle into position to receive the web or mat and to carry the full spindle into position for removal of the bale or roll therefrom. The reel-shaft 30 is continuously driven when the machine is in operation and is provided at one end with band-pulley 31, which is connected by drive-belt 32 with band-pulley 33, secured to the journal of the lower compressing-roll 15. A guide 34 is located between the compressing-rolls and the reel, so as to direct the web or mat to the spindles. The upper plate or wall 35 of the guide is provided with a cutting edge 36, which coöperates with a corresponding cutting edge 37 at the outer end of plate 38, which also serves to support the mat or web in its travel to the spindles. When the parts are in their normal position, the belt 62 and guide 38 normally incline rearward and downward, as indicated most clearly in Fig. 2, so as to give proper direction to the mat or web.

The reel comprises heads 39 and 40 and connecting-bars (not shown) to form a substantial structure for firmly supporting the working parts and to cause the heads 39 and 40 to move in unison. Spindles 41 are journaled to the reel and are located at diametrically opposite points and are mounted in bearings 42, secured to the head 39, said bearings being of sufficient length to provide a substantial support for the spindles, which are free at their inner ends. The spindles 41 are geared at their outer ends to shafts 43, radially disposed and journaled at their inner ends in collar 44, loosely mounted upon the reel-shaft 30 and mounted at their outer ends in bearings 45, secured to the reel-head 39. While any form of gearing may be employed for connecting the spindles 41 to the respective shafts 43, the bevel-gearing 46 illustrated is employed, the companion bevel-gears being secured to the respective parts 41 and 43 in any accustomed way.

Inasmuch as it is necessary to drive the spindles at a gradually-decreasing speed in order to compensate for the increase in the diameter of the roll or bale in the winding of the web or mat upon the spindle, provision must be had for this, and the following means have been devised, the same constituting a variable-speed gearing. To the reel-shaft 30 is secured the friction-disk 47, so as to rotate therewith, and a friction-gear 48 is slidably mounted upon each of the shafts 43 and is keyed thereto in any manner, so as to rotate therewith. The friction-gears 48 are moved across the friction-disk 47 in such a manner as to gradually decrease the speed of the spindles, so as to insure winding thereon of the mat or web as fast as produced by the web-forming mechanism. When the empty spindle is in position to receive the loose end of the web or mat, the friction-gear 48, applied to the shaft 43 in gear therewith, is in contact with the outer portion of the friction-disk 47, and as the mat is wound upon the spindle the friction-gear 48 is moved inward toward the center of the friction-disk 47. This operation is accomplished by means of arm 49, secured at its outer end to shaft 50 and having its inner end in engagement with the friction-gear 48. As will appear more fully hereinafter, the shaft 50 is gradually turned as the roll increases in diameter and moves the arm 49, so as to carry the friction-gear across the friction-disk toward the center thereof, whereby the speed of the spindle upon which the roll is forming decreases. The outer face of the friction-disk 47 is depressed at or near its center, as shown at 51, whereby when the friction-gear 48 reaches the limit of its inward movement it automatically becomes disengaged from the friction-disk, as indicated most clearly in Fig. 4. An instant later a friction-gear 52, secured by a feather-and-spline connection to each of the shafts 43, so as to rotate therewith and free to slide thereon, is brought into frictional engagement with the outer edge portion of the friction-disk 47, so as to rotate the spindle 41 at a comparatively high speed. This operation is effected by means of an arm 53, secured at its outer end to shaft 50 and adapted to engage at its inner end with the friction-gear 52. The inner or free end of each of the arms 53 is constructed so as to engage with and disengage itself from the friction-gear 52. For this purpose a spring-fork 54 is attached to the free end of arm 53, and the friction-gear 52 is flanged for the fork to engage therewith, said flange also serving to limit the inward movement of the friction-gear 52 by engagement with the outer edge of the friction-disk 47.

Two shafts 55, located at diametrically opposite points, are journaled in the heads 39 and 40 of the reel and project at one end beyond the head 39 and are provided with arms 57, from which projections 58 extend for a purpose presently to be described. An arm 56 is secured to each of the shafts 55 near the ends thereof and adjacent to the heads 39 and 40 of the reel. The arms 56 have their end portions projected to unequal distances from the shafts 55 and support shafts 59, 60, and 61. Endless belts or aprons 62 are supported at their ends upon rollers 63 and 64, mounted upon the respective shafts 59 and 60. The rollers 64 are of metal, so as to weight the outer ends of the arm 56 and serve to force the inner ends of said arms toward the spindles 41. The rollers 63 are preferably of wood or other light material and are separated by disks 65, which serve to indent the winds or wraps of the web or mat in the formation of the roll or bale 66. Stout coil-springs 67 are connected at one end to each of the shafts 55 and are secured at the other end to the respective reel-heads and supplement the action of the weighted rollers 64 in forcing the disks or parts 65 into the roll 66. The endless belts or aprons 62 move with their upper portions traveling toward the spindles, so as to assist in winding the mat thereon. In Fig. 2 the relative position of the arms 56 is shown in connection with the roll being formed. A guard 68 is provided for the traveling bed, formed by means of the belt 62, to insure even winding of the web upon the spindles. A roller 69 is mounted upon the shaft 61 and is grooved to receive the outer edge portion of the disks or indenting-wheels 65. A sprocket-wheel 70 is secured to an end of each of the shafts 59 and is connected by a drive-belt 71 with a corresponding sprocket-wheel 72 on shaft 55. A gear-wheel 73, secured to shaft 59, is in mesh with an idler 74, mounted upon a pin or stud extended inward from the arm 56 and in turn meshing with gear-wheel 75, secured to roller 69, so as to rotate therewith.

Shafts 76 are located at diametrically opposite points and are journaled to the head 39 and are provided with sprocket-wheels 77 and 78. Drive-belts 79 and 80 connect the respective sprocket-wheels 77 and 78 with sprocket-wheels 81 and 82, applied to the respective shafts 55 and 50. A third sprocket-wheel 83, secured to the outer end of shaft 76, is connected by drive-belt 84 to sprocket-wheel 85, mounted upon the reel-shaft 30.

Arms 86 are mounted upon the ends of shafts 50 and extend inward and support shaft 87, upon which are mounted a series of weighted rollers 88 and disks or indenting-wheels 89. The disks or indenting-wheels 89 are located opposite the respective disks or indenting-wheels 65, so as to run in the same grooves or tracks formed thereby. A series of arms 90 are loosely mounted upon shaft 50, and their hubs 91 are sufficiently large to receive stout coil-springs 92, which are connected at one end to the hub and at the other end to the shaft 50, so as to have independent movement. Each of the arms 90 is provided at its free end with a roller 91ª, loosely mounted upon a stud or pin provided at the outer end of the respective arms. Endless belts 93 are supported upon the rollers 91ª, 88, and 69 and are adapted to bear against the roll 66 and to prevent the escape of any loose particles, said belts also serving to compress the layers and cause the web or mat to wind compactly. The spring-actuated arms 90 are tension devices for automatically taking up any slack in the belt 93 and maintaining the same taut, so as to insure their exerting pressure upon the roll in the formation thereof.

A clutch is provided between the reel and shaft 30, and consists of the members 94 and 95, the part 94 being secured to the reel for rotating therewith and the part 95 being slidable upon shaft 30 and connected thereto by a feather and spline, so as to rotate therewith. When the reel is stationary, the parts 94 and 95 of the clutch stand separated, and at the proper time—that is, when the roll 66 has reached the predetermined size and the shaft 55 is turned so as to bring projection 58 into engagement with spring-actuated catch 96, so as to release the reel—the clutch is thrown into engagement in the manner and by the means now to be described and the reel turned to carry the filled spindle to a point for removal of the roll therefrom and to bring the empty spindle into position for the winding of the mat thereon. Eccentric-shafts 97 are oppositely disposed and journaled in bearing 98, applied to the inner side of reel-head 39, and their outer ends are provided with arms 99, which are connected to rods 100, slidably mounted in keepers 101, applied to the outer face of the reel-head 39. A coil-spring 102 is mounted upon each rod 100 and is confined between the inner guide 101 and stop 103, secured to rod 100. When shaft 55 occupies a position with the indenting wheels or disks 65 bearing against spindle 41, arm 57 bears against rod 100 and holds spring 102 compressed. As the roll 66 increases in diameter and the indenting-wheels 65 move outward shaft 55 turns and moves arm 57 outward, and rod 100 correspondingly moves under the tension of spring 102 until catch 96 is disengaged from the reel. The eccentric-shaft 97, connected with the moving rod 100, throws the clutch into engagement, whereby motion is imparted to the reel. A lever 104 is pivotally connected at one end to rod 100, and a trip-rod 105 is pivotally connected to the opposite end of lever 104 and is slidably mounted in keepers 106, and as rod 100 moves outward rod 105 correspondingly moves outward. When the reel makes a half-revolution projecting end of rod 105 comes into contact with stop 107, applied to a sill of the frame, and moves said rod 105 inward and causes a corresponding inward movement of rod 100 and a return of eccentric-shaft 97 to a normal position, whereby the clutch is thrown out of gear and the reel thrown out of action and secured by catch 96 engaging with stop-shoulder 108.

The baling-chambers 117 are secured to a yoke 118, which is loosely mounted upon the reel-shaft 30. Stops 109 are applied to the inner ends of the baling-chambers 117 and coöperate with spring-actuated arms 110, applied to the inner head of the reel. When the reel makes a half-turn, one of the arms 110 engages with a stop 109 and correspondingly moves the baling-chambers, whereby the spindle previously emptied is brought into position to receive the roll, and the one previously filled is brought into position for coöperation with the compressing mechanism.

The follower or plunger 133 is attached to the inner end of feed-screw 134 and is adapted to be forced into the lowermost cylinder or baling-chamber 117 for compressing the roll therein. Nut 135, through which feed-screw 134 passes, is loosely mounted in standard 136, so as to resist endwise movement, and is provided at its ends with gear-wheels 137 and 138. At the outer end of feed-screw 134 is collar 139, notched to receive a guide-bar 140, by means of which feed-screw 134 is prevented from rotation, said collar 139 also serving as a stop to throw the actuating mechanism into and out of gear. Gear-wheels 141 and 142 are loosely mounted upon an end portion of shaft 30 and are held from movement thereon in one direction by collars 143. Gear-wheel 141 is in mesh with idler 144, which in turn is in mesh with gear-wheel 137, whereby motion is transmitted from shaft 30 to nut 135 when gear-wheel 141 is clutched to shaft 30. Gear-wheel 142 is in mesh with idler 145, which in turn is in mesh with idler 146, meshing with gear-wheel 138, whereby motion is transmitted from shaft 30 to feed-screw 134 when gear-wheel 142 is in clutched engagement with said shaft 30. Follower or plunger 133 is advanced by a slow movement, but is rapidly returned to a normal position after the bale has been subjected to the required degree of compression.

Gear-wheels 141 and 142 are formed in their inner faces with conical depressions constituting clutch members and are adapted to coöperate with companion clutch members 147 and 148, loose upon shaft 30, but keyed thereto for rotation. Shafts 149 and 150 are mounted in bearings 151 in parallel relation and terminate in cam portions 152, which are adapted to engage with the clutch members 147 and 148 at the proper time to effect either an advance or a withdrawal of the plunger. Shaft 149 is provided with arm 153, to which rod 154 is connected, said rod extending within the path of a cam 155, attached to each of the cylinders 117, whereby in the movement thereof rod 154 is tripped, so as to throw clutch member 147 into engagement with clutch member of gear-wheel 141, whereby feed-screw 134 is actuated to force follower 133 into the lowermost cylinder or baling-chamber 117. A second rod 156 is attached to arm 153 and passes loosely through arm 157, adjustably secured to rod 158, attached to arm 159 of shaft 150. A stop 160 is adjustably secured to rod 156 and is adapted to be struck by arm 157, so as to effect disengagement of clutch member 147 from clutch member of gear-wheel 141. Arm 161 is adjustably connected to the outer end of rod 158 and is adapted to be struck by stop 139 of feed-screw 134, so as to throw clutch element 148 out of engagement of gear-wheel 142 when follower 133 has reached the limit of its outward movement. As the cylinder or baling-chamber 117, containing the bale to be compressed, reaches its lowermost position between head 132 and follower 133 cam 155 strikes rod 154 and moves same to effect turning of shaft 149, whereby gear-wheel 141 is clutched to shaft 30 and nut 135 rotated so as to advance follower 133 within the cylinder and compress the roll or bale therein. When follower 133 has reached the prescribed point within the cylinder, stop 139 strikes arm 157 and moves rod 158 and rod 156, whereby gear-wheel 141 is released and gear-wheel 142 clutched to shaft 30, both movements being simultaneous by reason of arm 157 striking stop 160. Feed-screw 134 is moved outward by reverse rotation of nut 135, and when follower 133 clears the cylinder stop 139 strikes arm 161 and effects a release of gear-wheel 142. At this instant a new roll or bale has been formed and the reel operated to bring same in position for ejecting, and as the reel completes its half-revolution the baling chambers or cylinders 117 are correspondingly rotated for the purpose stated.

The worm-thread fastened to spindle on its entire length is about an inch deep and has a pitch of one thread to two inches length of the spindle. As the spindle is thirty-six inches long the worm-thread winds about the spindle eighteen times. The following means are used to remove the bale from the spindle: When the bale has reached the predetermined size, the spindle is rotated at a maximum speed. The object of this increased speed is to force the bale off from the spindle. It will be noted that the material is tightly wound about the spindle when bale is beginning to be formed, and the worm-thread is consequently incased in tightly-wound fibrous material. The bale then can be likened in its relation to the worm-threaded spindle as a nut to a threaded bolt. When the bale has reached the predetermined size, it is rotating at the minimum speed or as fast as the apron-belt and indenting rollers and disks cause it to rotate. It is manifest, then, if the bale rotates at the minimum speed and the spindle at the maximum the bale will be slowly forced from the spindle and pressed into the condensing-chamber, which in turn forces the finished roll out of the condensing-chamber. This is done without tearing or disarranging the circumference surface of the roll.

The indenting-disks are gradually directed out of the indentations which they have formed as the bale travels longitudinally, and the belts as the roll passes beyond them each drop back into normal position, and the arms bearing the rollers and disks drop back into normal position without undue force as the weight of the weighted rollers are exerted against the tension-springs, the half-revolution of the reel bringing the weighted rollers in reverse position instead of with them. It will be noted, then, that if the spindle makes forty-five revolutions per minute and the bale rotates but fifteen the bale will be forced from the spindle in thirty seconds.

Having thus described the invention, what is claimed as new is—

1. In a baling-machine, means for forming fibrous material into a mat or web, and means for applying grain to a side of said mat, substantially as set forth.

2. In a baling-machine, the combination of means for forming fibrous material into a mat or web, and means for applying grain in regulable quantity to a side of said mat, substantially as described.

3. In a baling-machine, a hopper, a partition subdividing the hopper into approximately upright compartments, one of said compartments being adapted to receive fibrous material and the other compartment grain, means for forming the fibrous material into a mat or web, and means for adjusting said partition to regulate the escape of grain and the amount to be applied to a side of the mat, substantially as specified.

4. In a baling-machine, the combination of juxtaposed compartments, one adapted to receive fibrous material, the other grain, a toothed roller located in the lower portion of the compartment receiving the fibrous material, a bar arranged below the other compartment and inclined downwardly and rearwardly with reference to the direction of movement of the fibrous material, and strippers applied to said bar and coöperating with the toothed roller and a side of the hopper, substantially as specified.

5. In combination, means for forming fibrous material into a mat or web, and means for applying grain to a side of said mat, substantially as described.

6. In combination, means for forming fibrous material into a mat or web, means for applying grain to a side of said mat, and compressing mechanism for embedding said grain into the mat, substantially as set forth.

7. In a machine of the character described, and in combination with mechanism for forming fibrous material into a mat or continuous web, a shaft adapted to be continuously driven, a reel loosely mounted upon said shaft, spindles journaled to the reel for winding the mat or web thereon, shafts journaled to the reel and rotatable therewith and in gear with said spindles, a friction-disk secured to the reel-shaft for rotation therewith, friction-pulleys slidably mounted upon the shafts geared to the spindles and keyed for rotation therewith, and means controlled by the roll or bale to effect a shifting of the friction-pulleys on their supporting-shafts to decrease the speed of the spindles proportionately as the diameter of the roll or bale increases, substantially as specified.

8. In a machine of the character described, and in combination with means for forming fibrous material into a mat or continuous web, a shaft adapted to be continuously driven, a reel loosely mounted upon said shaft, spindles journaled to the reel for winding the mat or web thereon, shafts 43 radially disposed and in gear at their outer ends with said spindles, bearings for said shafts applied to the reel and its shaft, a friction-disk secured to the reel-shaft for rotation therewith, friction-pulleys slidably mounted upon shafts 43 and keyed for rotation therewith, and means for shifting the friction-pulleys along shafts 43 as the diameter of the rolls or bales increases to reduce the speed of its spindle, substantially as set forth.

9. In a machine of the character described, and in combination with mechanism for forming fibrous material into a mat or continuous web, a shaft adapted to be continuously driven, a reel loosely mounted upon said shaft, spindles journaled to the reel for winding the mat or web thereon, shafts 43 radially disposed and in gear at their outer ends with said spindles, bearings for said shafts applied to the reel and its shaft, a friction-disk secured to the reel-shaft for rotation therewith, friction-pulleys slidably mounted upon shafts 43 and keyed for rotation therewith, spring-actuated bars journaled to the reel, arms extended from said bars and in engagement with said friction-pulleys to effect a shifting thereof along shafts 43, and compressors extended from said bars and adapted to bear against the outer side of the roll or bale, substantially as set forth.

10. In a machine of the character described, and in combination with mechanism for forming fibrous material into a mat or continuous web, a shaft adapted to be continuously driven, a reel loosely mounted upon said shaft, spindles journaled to the reel for winding the mat or web thereon, shafts in gear with said spindles, a friction-disk secured to the reel-shaft for rotation therewith, and having a portion cut away, friction-pulleys slidably mounted upon the shafts geared to the spindles and keyed for rotation therewith, and means controlled by the rolls to effect a shifting of the friction-pulleys and their supporting-shafts to decrease the speed of the spindles proportionately as the diameter of the roll increases and adapted to clear the friction-disk when reaching the cut-away portion thereof, substantially as set forth.

11. In a machine of the character described, and in combination with mechanism for forming fibrous material into a mat or continuous web, a shaft adapted to be continuously driven, a reel loosely mounted upon said shaft, spindles journaled to the reel for winding the mat or web thereon, shafts journaled to the reel and in gear with said spindles, a friction-disk secured to the reel-shaft for rotation therewith, and having a portion cut away, friction-pulleys slidably mounted upon the shafts geared to the spindles and keyed for rotation therewith, a second set of friction-pulleys similarly mounted upon the shafts, and means controlled by the roll to effect a shifting of the two sets of friction-pulleys whereby when the first set of pulleys is thrown out of action the second set is brought into action with the friction-disk, substantially as set forth.

12. In a machine of the character described, and in combination with mechanism for forming fibrous material into a mat or continuous web, a shaft adapted to be continuously driven, a reel loosely mounted upon said shaft, spindles journaled to the reel for winding the mat or web thereon, shafts in gear with said spindles, a friction-disk secured to the reel-shaft for rotation therewith, two sets of friction-pulleys slidably mounted upon the shafts geared to the spindles and keyed for rotation therewith, and means controlled by the roll to successively effect a shifting of the friction-pulleys whereby one set is thrown out of action and the other set is brought into action, substantially as specified.

13. In a machine of the character described, and in combination with mechanism for forming fibrous material into a mat or continuous web, a shaft adapted to be continuously driven, a reel loosely mounted upon said shaft, spindles journaled to the reel for winding the mat or web thereon, shafts in gear with said spindles, a friction-disk secured to the reel-shaft for rotation therewith, two sets of friction-pulleys slidably mounted upon the shafts geared to the spindles and keyed for rotation therewith, a shaft, means connected with said shaft for coöperation with the roll to effect a turning of said shaft proportionately as the roll increases in diameter, and two arms secured to each of the shafts and adapted to successively engage with a set of friction-pulleys to effect a movement thereof, substantially as described.

14. In a machine for forming a mat or continuous web of fibrous material into a roll or bale, and in combination with the roll-forming mechanism, a series of disks for indenting or tucking in the material as the same is formed into a roll, substantially as set forth.

15. In a machine for forming a mat or continuous web of fibrous material into a roll or bale, and in combination with the roll-forming mechanism, a series of disks for indenting or tucking in the material as the same is formed into a roll, and means for disengaging said disks from the roll to admit of its removal from the supporting-spindle, substantially as set forth.

16. In a machine for forming a mat or continuous web of fibrous material into a roll or bale, and in combination with the roll-forming mechanism, a series of rollers and disks alternately disposed and adapted to exert a pressure upon the roll during its formation, the disks indenting or tucking in the material to effect a binding of the layers or winds, substantially as described.

17. In a machine for forming a mat or web of fibrous material into a roll or bale, a spindle for winding said mat thereon, and a traveling bed adapted to direct the mat upon the spindle and to insure a compact winding of the mat thereon said bed yielding to the increasing diameter of the roll and composed of a series of elements independently movable to allow for inequalities of the roll, substantially as described.

18. In a machine for forming a mat or web of fibrous material into a roll, a spindle for winding said mat thereon, a traveling bed for directing the mat to the spindle, said bed being composed of a series of belts, and separate means for normally pressing each belt of said bed toward the spindle to insure compact winding of the mat thereon, substantially as specified.

19. In a machine for forming a mat or web of fibrous material into a roll, a spindle for winding the mat thereon, a traveling bed for directing the mat to the spindle, weighted rollers applied to said bed and adapted to form a support for the traveling part and a movable support for the spindle, bed and weighted rollers to cause the rollers to press the bed toward the spindle in one position of the support and to cause the rollers to move the bed away from the spindle in another position of the support, substantially as set forth.

20. In a machine for forming a mat or web of fibrous material into a roll, a spindle for winding said mat thereon, arms pivoted at a point between their ends, weighted rollers applied to the outer ends of said arms, a shaft supported at the inner ends of said pivoted arms, and endless belts supported at their ends by the weighted rollers and the said shaft, substantially as specified.

21. In a machine for forming a mat or web of fibrous material into a roll, a spindle for winding said mat thereon, arms pivoted at a point between their ends, shafts at opposite ends of said arms, weighted rollers mounted upon the outer shaft, rollers and disks alternately arranged upon the inner shaft, and endless belts supported by the two sets of rollers and separated by the indenting-disks, substantially as set forth.

22. In a machine for forming a mat or web of fibrous material into a roll, a spindle for winding the mat thereon, oppositely-disposed pivoted arms, and indenting-disks carried by said arms for tucking or binding the winds of the mat in the formation of the roll, substantially as set forth.

23. In a machine for forming a mat or web of fibrous material into a roll, a spindle for winding said mat thereon, rollers located upon opposite sides of the spindle, endless belts carried by said rollers and arranged to exert a pressure upon the mat in the formation of the roll, movable supports for said rollers and independent tension means for each of the belts, substantially as set forth.

24. In a machine for forming a mat or web of fibrous material into a roll, a spindle for winding said mat thereon, a pivoted support at one side of the spindle, a roller carried thereby, an independent support at the opposite side of the spindle, a roller carried thereby, endless belts supported by the said rollers, and independent means for maintaining each of said belts under tension, substantially as described.

25. In a machine for forming a mat or web of fibrous material into a roll, a spindle for winding said mat thereon, a pivoted support, a roller carried thereby, an independent support, a roller carried thereby, endless belts supported by the said rollers, spring-actuated arms, and rollers carried by said spring-actuated arms and adapted to engage with said belts and maintain same under tension, substantially as set forth.

26. In a machine for forming a mat or web of fibrous material into a roll, a spindle for winding said mat thereon, pivoted arms, a roller supported by said pivoted arms, a second set of pivoted arms, rollers supported thereby, spring-actuated arms, rollers applied thereto, and endless belts supported by the several sets of rollers, substantially as described.

27. In a machine for forming a mat or continuous web of fibrous material into a roll, a reel provided with spindles upon which the mat is wound, a power-driven shaft having the reel loosely mounted thereon, a clutch having one of its members secured to said reel and the other member loose upon the drive-shaft and keyed for rotation therewith, oppositely-disposed shafts 97 having eccentric portions for coöperation with the loose clutch member to effect engagement of the clutch, spring-actuated bars normally held in restraint and connected with shafts 97 to turn same and throw the clutch into engagement when the bars are released from the restraining influence, and a trip mechanism connected with each of said spring-actuated bars to effect a resetting thereof and to throw the clutch out of action, substantially as described.

28. In a machine for forming a mat or continuous web of fibrous material into a roll, a reel provided with spindles upon which the mat is wound, a power-driven shaft having the reel loosely mounted thereon, a clutch having one of its members secured to said reel and the other member loose upon the drive-shaft and keyed for rotation therewith, oppositely-disposed shafts 97 having eccentric portions for coöperation with the loose clutch member to effect engagement of the clutch, spring-actuated bars normally held in restraint and having crank connection with shafts 97, oppositely-disposed rods 87, levers pivoted intermediate of their ends and having rods 87 and the aforementioned spring-actuated bars connected thereto, and a trip arranged to engage with rods 87 and reset the spring-actuated bars and permit unshipping of the clutch, substantially as set forth.

29. In a machine of the character described, and in combination with the mat-forming mechanism and means for winding the mat into a roll, means for removing the rolls from the spindle, a baling-chamber for receiving the roll, means for moving the baling-chamber after the roll has been received therein, and a compress mechanism for condensing the roll within the baling-chamber, substantially as set forth.

30. In combination, mat-forming mechanism, means for winding the mat into rolls, means for withdrawing the rolls from the reeling mechanism, corresponding baling-chambers arranged to admit of the roll entering one simultaneously with its withdrawal from the reeling mechanism, means for securing the baling-chambers in proper position, and a compress mechanism for condensing the roll in the baling-chambers, substantially as described.

31. In combination, a drive-shaft, a reel loosely mounted upon said shaft, a clutch mechanism between said reel and shaft, companion baling-chambers loosely mounted upon said drive-shaft, a clutch mechanism between said baling-chambers and shaft and adapted to be actuated from the reel, an ejector located intermediate of the reel and baling-chambers, a cam movable with the baling-chambers to effect a movement of the ejector toward the reel, a follower for coöperation with the baling-chambers for condensing the rolls therein, a feed-screw projected from said follower, a nut threaded upon said feed-screw and provided with gear-wheels of different dimensions, corresponding gear-wheels loosely mounted upon the aforementioned drive-shaft and provided with clutch elements, idlers connecting the gear-wheels of the said nut with the gear-wheels loosely mounted upon the drive-shaft, clutch members loose upon the drive-shaft and adapted to coöperate with the companion parts of the gear-wheels provided with the loose clutch elements, independent shafts having eccentric portions for coöperation with the respective movable clutch members, rods having crank connection with said shafts, and trips applied to said rods for coöperation with corresponding trips of the feed-screw and baling-chambers to throw the trains of gearing into and out of action automatically, whereby the follower is advanced, withdrawn and brought to a state of rest, substantially as set forth.

32. In combination, a spindle provided with a worm-thread, means for uniformly supplying a web of fibrous material, means for rotating the spindle at a gradually-reducing speed to wind the web thereon at the rate of speed fed thereto, indenting-disks for tucking in the winds, endless belts for compressing the winds, and means for rotating the belts and spindle at different rates of speed to cause automatic ejectment of the roll from the spindle by the action of the worm-thread, substantially as set forth.

In testimony whereof I affix my signature in presence of two witnesses.

MELCHIOR L. LUEBBEN. [L. S.]

Witnesses:
E. E. CULVER,
THEO. MILLER.